Jan. 13, 1942. J. A. BUNDY ET AL 2,269,970
GEARSHIFT MECHANISM
Filed Oct. 23, 1940 2 Sheets-Sheet 1
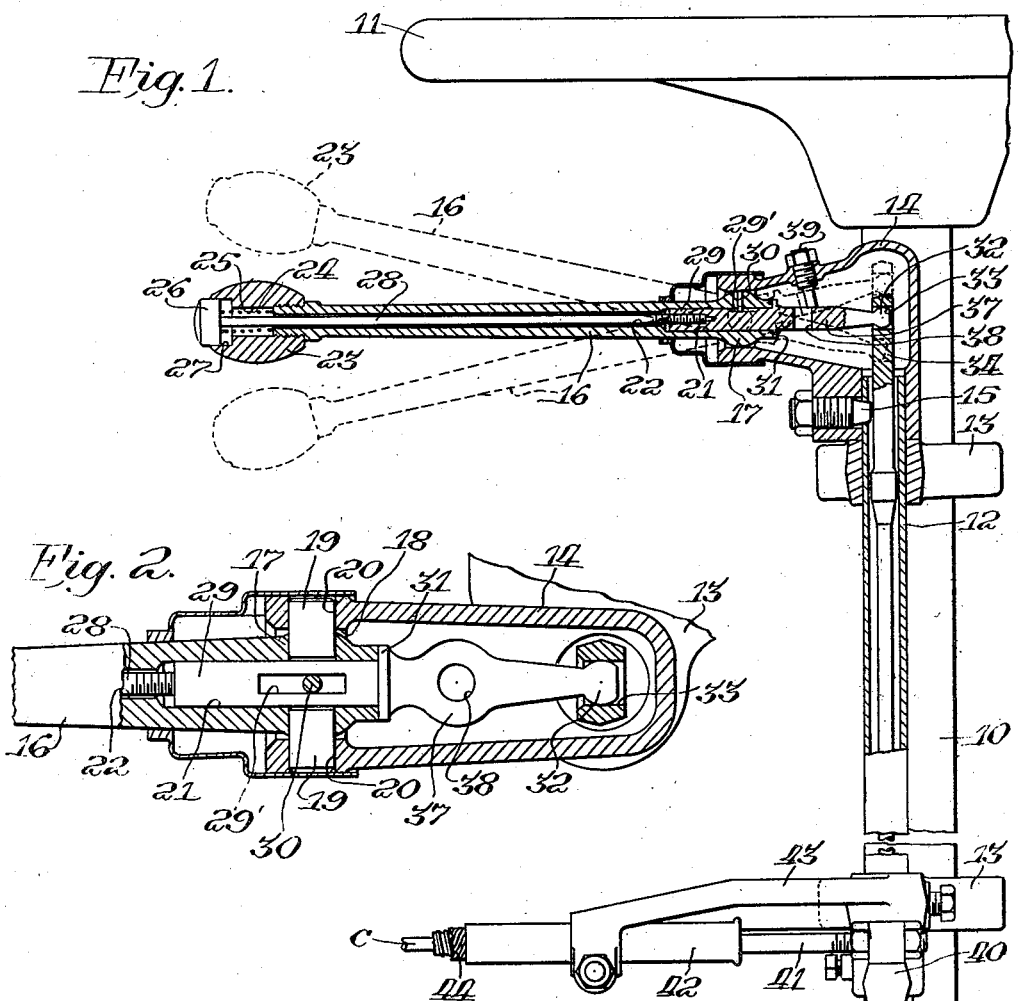
Fig. 1.
Fig. 2.
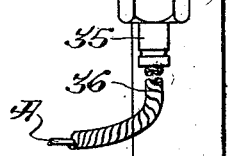
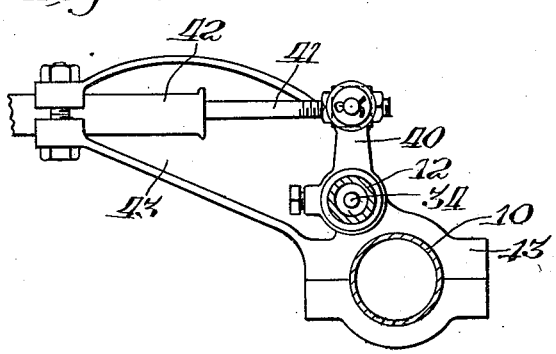
Fig. 3.
Inventors
James A. Bundy,
and Frank W. Avilia
By Paul O. Pippel Atty.

Jan. 13, 1942.  J. A. BUNDY ET AL  2,269,970

GEARSHIFT MECHANISM

Filed Oct. 23, 1940  2 Sheets-Sheet 2

Inventors
James A. Bundy,
and Frank W. Avila
By, Paul O. Pippel Atty.

Patented Jan. 13, 1942

2,269,970

UNITED STATES PATENT OFFICE 2,269,970

GEARSHIFT MECHANISM

James A. Bundy and Frank W. Avila, Fort Wayne, Ind., assignors to International Harvester Company, a corporation of New Jersey Application October 23, 1940, Serial No. 362,370

3 Claims. (Cl. 74—484)

This invention relates to improvements in gearshift mechanism for motor vehicles, and particularly to one for use in trucks and other motor vehicles which make use of four-speed transmissions in which four forward speeds are provided in addition to the reverse speed. Specifically, the invention relates to a reverse lockout mechanism.

The principal object of the invention is to provide a novel means of locking a remote control gear-shift mechanism out of reverse position; that is, to lock the shifting mechanism so that only the forward speeds are engageable during normal operation.

A more specific object is to provide a lockout mechanism carried by the shifting lever of a steering column type of gear-shift mechanism, which can be readily operated by one finger of the operator prior to the shifting operation.

Another subsidiary object is to incorporate into a remote control gear-shift mechanism means for operating a transmission of the gearselector type having three shifter rods.

The above objects and others will be apparent from the description, and are accomplished by a construction as shown in the drawings, in which:

Figure 1 is a view partly in elevation and partly in section, showing a remote gear-shift mechanism mounted on the steering column of an automotive vehicle;

Figure 2 is a transverse section taken through the head portion of the shifting mechanism to show the details of the shifting lever;

Figure 3 is a bottom plan view, showing the connection between the shifting mechanism and the cables leading to the transmission;

Figure 4:
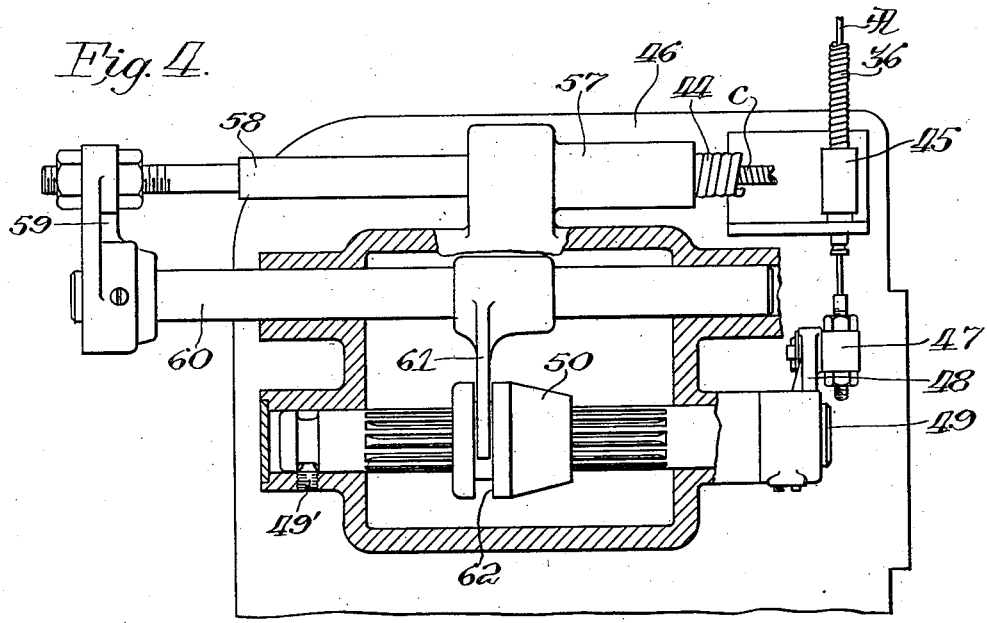
Figure 4 is a top plan view of a transmission with the cover broken away in section to show the connection of the shifting cables with the gear-selecting mechanism within the transmission; and, Figure 5 is a vertical section showing the interior of the transmission cover and the shifting rods with a portion of the figure in end elevation to show the connection of the shifting mechanism.

In the drawings, only such parts of the automotive vehicle and the transmission mechanism are shown as are necessary to illustrate the invention. It will be understood that the shifting mechanism could be applied to any conventional type of vehicle using remote control.

Although, as illustrated, the cables are utilized, it is to be understood that links might be used under some conditions.

A steering column 10 is illustrated with a steering wheel 11 at the upper end thereof. A hollow shaft or sleeve 12 is shown mounted closely adjacent the steering column, being rotatably supported by two spaced supporting brackets 13. A hollow housing or head structure 14 is rigidly secured to the upper end of the sleeve 12 by a set-screw 15.

A shifting lever 16 is provided with a spherical enlargement 17 fitted in an opening 18 formed in the housing 14. Two short pins 19 extend through alined openings 20 in the housing 14 and into the spherical portion 17 of the lever 16. The inner ends of the pins 19 terminate in spaced relation to provide for an axial bore 21 extending into the housing end of the lever 16. A smaller bore 22 extends from the bore 21 entirely to the other end of the lever 16.

A knob 23 is threaded on the outer end of the lever 16. A bore 24 within said knob provides space for a compression spring 25. Said spring abuts the end of the lever 16 and the inner side of a finger button 26. Said button is mounted for reciprocation in a larger bore 27 formed at the outer end of the knob.

The finger button 26 is mounted on a shaft 28, which slidably extends through the bore 22. At its inner end the shaft 28 is threaded into the plunger-like end of an actuating element 29. Said element is provided with a keyway 29' into which a pin 30 extends to hold the element against rotation. A shoulder 31 is formed on the element 29 in a location to abut the inner end of the lever 16. The spring 25 maintains the shoulder 31 in abutting position until movement axially by pressure of the operator's finger on the button 26.

The inner end of the element 29 within the housing 14 is provided with a spherical end portion 32 which is slidably located in a transverse bore 33 formed in the upper end of a selector rod or shaft 34. Said shaft is mounted for reciprocation in the sleeve 12, being connected at its lower end to a cable A which extends through a fitting 35 into a protecting sheath 36. The details of this construction have not been shown because any conventional cable construction may be utilized, and this construction specifically is not a part of the invention.

The portion of the actuating element 29 lying within the housing 14 is provided with an enlargement 37, in which an opening or recess 38 is formed. The opening is located with respect to a stop element 39, so that, during normal operation of the shifting lever, a portion of the lever abuts the inside end of the stop element 39. It will be noted that said element is threaded in the housing 14, so that it may be adjusted to obtain the proper limiting position. The opening 38 is located in such a position that, when the button 26 is pushed inwardly to move the actuating element 29 axially in the shifting lever 16, the opening comes into alinement with the stop element, whereby the shifting lever may be moved into the dotted line position below the full line position. The upper dotted line position shows the normal position of the shifting lever when it is moved to select the second shifter rod, as will be hereinafter described.

At the bottom of the sleeve 12, a lever arm 40 is connected for attaching the sleeve to a rod-like element 41. Said rod extends into a fitting 42 carried by an extension 43 of the lower bracket 13. A sheath or protecting cover 44 is secured to the fitting 42. An actuating cable C is fitted within the sheath connected to the element 41.

Referring now to Figure 4, the cable A with its sheath 36 is connected to a fitting 45 carried by a transmission cover 46. The cable extends from said fitting and is connected by a fitting 47 with a lever arm 48 rigidly mounted on a shaft 49. Said shaft is rotatably carried by the transmission cover being held against endwise movement by a cap-screw 49' seating in a recess formed on the shaft.

Figure 5:
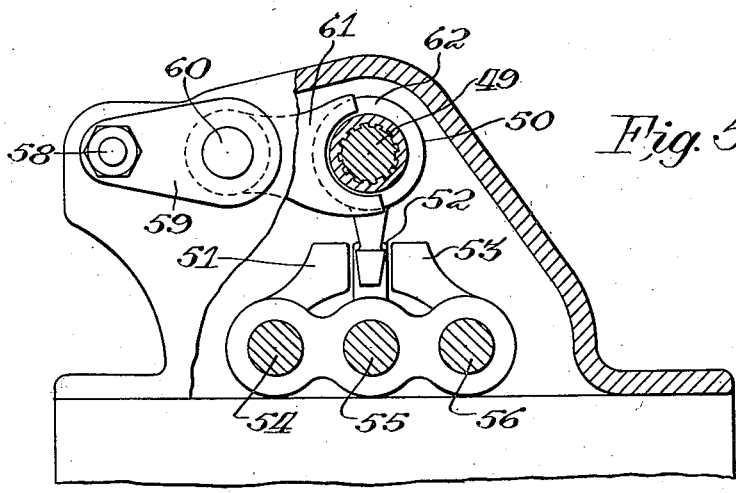

As shown in Figure 5, a selecting element 50, splined on the shaft 49, is oscillatable to engage any one of the elements 51, 52, and 53. These elements are secured to shifter rods 54, 55, and 56. This construction has not been shown in detail, as it is conventional in transmission constructions and is a part of the present invention only as it illustrates a plurality of shifter rods. In the position shown, the center shifter rod 55 is engaged. By moving the lever to the upper dotted line position, the shifter rod 56 may be selected. By depressing the button 26 and moving the shifting lever to the lower dotted line position, the other rod 54 may be selected. This is preferably the reverse gear, although another gear, not frequently used, might be actuated by the shifter rod 56.

Referring again to Figure 4, the cable C and its sheath 44 are connected to a fitting 57. Within said fitting, the cable is connected to an element 58, which is secured to a connecting member 59 rigidly mounted on a shaft 60. Said shaft is mounted for reciprocation in the transmission cover and carries within the cover an actuating fork 61. Said fork engages an annular recess 62 formed in the member 50. By fore and aft movement of the rod 60, the member 50 is also moved to select the gears which are engaged by movement of the shifter rods 54, 55, and 56. It will be understood that, after the shifter rod has been selected by up and down movement of the selector lever 16 about the pivot axis of the pins 19, the sleeve may be moved to angularly change the position of the lever 12 and thereby, through the cable C, select the gears connected to the different shifter rods.

The operation of the mechanism making up this invention has been described in connection with the description of the drawings. It is to be understood that applicants have shown and described a preferred embodiment of their improved lockout mechanism for remote controls for transmission, and that they claim as their invention all modifications falling within the scope of the appended claims.

What is claimed is:

1. A gear-shift mechanism for a motor vehicle of the remote control type having a transmission with three shifter rods, and in combination, supporting means, a sleeve rotatably mounted on said means, a hollow head structure rigidly carried by said sleeve, a shifting lever extending into said structure and pivotally mounted for movement on an axis at right angles to the axis of the sleeve, an actuating element slidably and non-rotatably mounted in said lever, resilient means for urging said element in an outward direction, means for manually moving the element in an inward direction, a shifter rod selecting member formed with a transverse opening at the upper end and being reciprocable in the sleeve, said actuating element extending into the opening and being movable in an angular direction and transversely with respect to the selecting member, and a stop element secured to the head structure and extending into the normal path of movement of the actuating element, thereby limiting movement of the shifting lever in that direction, whereby only two of the shifter rods may be selected, said actuating element being provided with a recess which is brought into registration with the stop element by axial movement of the actuating element whereby the shifter lever may be further moved to select the third shifter rod.

2. A gear-shift mechanism for a motor vehicle of the remote control type having a steering column and a transmission with three shifter rods, and in combination, a sleeve rotatably mounted adjacent said steering column, a head structure rigidly carried by said sleeve, a shifting lever pivotally mounted on said structure for movement on an axis at right angles to the axis of the sleeve, an actuating element slidably mounted on said lever, resilient means for urging said element in an outward direction, means for manually moving the element in an inward direction, a shifter rod selecting member formed with a transverse opening at the upper end and being reciprocable in the sleeve, said actuating element extending into the opening and being movable in an angular direction and transversely with respect to the selecting member, and a stop means on the head structure in the normal path of movement of the actuating element, thereby limiting movement of the shifting lever in that direction, whereby only two of the shifter rods may be selected, said actuating element being provided with a recess which is brought into registration with the stop element by axial movement of the actuating element whereby the shifter lever may be further moved to select the third shifter rod.

3. A gear-shift mechanism for a motor vehicle of the remote control type having a transmission with three shifter rods, and in combination, supporting means, a sleeve rotatably mounted on said means, a hollow head structure rigidly carried by said sleeve, a shifting lever extending into said structure and pivotally mounted for movement on an axis at right angles to the axis of the sleeve, an actuating element slidably mounted on said lever, resilient means for urging said element in an outward direction, means for manually moving the element in an inward direction, a shifter rod selecting member formed with a transverse opening at the upper end and being reciprocable in the sleeve, said actuating element extending into the opening and being movable in an angular direction and transversely with respect to the selecting member, and a cooperating stop means between the head structure and the actuating element extending into the normal path of movement of the actuating element thereby limiting movement of the shifting lever in one direction whereby only two of the shifter rods may be selected, said stop means being rendered inoperative by axial movement of the actuating element whereby the shifter lever may be further moved to select the third shifter rod.

JAMES A. BUNDY.
FRANK W. AVILA.